US008607141B2

(12) United States Patent
Ryu et al.

(10) Patent No.: US 8,607,141 B2
(45) Date of Patent: Dec. 10, 2013

(54) METHOD AND APPARATUS FOR SETTING FONT SIZE IN A MOBILE TERMINAL HAVING A TOUCH SCREEN

(75) Inventors: Shin-Dong Ryu, Gyeongsangbuk-do (KR); Dong-Wook Kwon, Gyeonggi-do (KR)

(73) Assignee: Samsung Electronics Co., Ltd, Yeongtong-gu, Suwon-si, Gyeonggi-do (KR)

( * ) Notice: Subject to any disclaimer, the term of this patent is extended or adjusted under 35 U.S.C. 154(b) by 142 days.

(21) Appl. No.: 12/870,014

(22) Filed: Aug. 27, 2010

(65) Prior Publication Data

US 2011/0055698 A1 Mar. 3, 2011

(30) Foreign Application Priority Data

Aug. 27, 2009 (KR) ........................ 10-2009-0080108

(51) Int. Cl.
*G06F 3/01* (2006.01)
(52) U.S. Cl.
USPC ............................ 715/702; 715/863; 715/864
(58) Field of Classification Search
USPC ................................. 715/702, 863, 864, 865
See application file for complete search history.

(56) References Cited

U.S. PATENT DOCUMENTS

| 7,747,527 | B1 * | 6/2010 | Korala ............................ 705/43 |
| 7,768,536 | B2 * | 8/2010 | Hyatt ............................ 345/660 |
| 2003/0011640 | A1 * | 1/2003 | Green et al. ................... 345/810 |
| 2003/0201320 | A1 * | 10/2003 | Venkatesh et al. ............. 235/383 |
| 2005/0035199 | A1 * | 2/2005 | Goci et al. ..................... 235/386 |
| 2005/0237310 | A1 | 10/2005 | Fabritius et al. |
| 2006/0077179 | A1 | 4/2006 | Hsu et al. |
| 2007/0097096 | A1 * | 5/2007 | Rosenberg ..................... 345/173 |
| 2008/0177994 | A1 * | 7/2008 | Mayer ................................ 713/2 |
| 2008/0284756 | A1 | 11/2008 | Hsu et al. |

FOREIGN PATENT DOCUMENTS

| KR | 10-0557214 | 2/2006 |
| WO | 2007/057736 A1 | 5/2007 |

* cited by examiner

*Primary Examiner* — Omar Abdul-Ali
(74) *Attorney, Agent, or Firm* — Cha & Reiter, LLC

(57) ABSTRACT

A method and apparatus for setting a font size in a mobile terminal having a touch screen. During a font size setting mode, an area of a region where a user's finger touches the screen is detected. A font size corresponding to the detected area is determined from among preset font sizes, and the determined font size is displayed in a specific region on the touch screen. If a font size setting request to the displayed font size is received from the user, the displayed font size is stored for a subsequent display on the touch screen.

18 Claims, 4 Drawing Sheets

METHOD AND APPARATUS FOR SETTING FONT SIZE IN A MOBILE TERMINAL HAVING A TOUCH SCREEN

CLAIM OF PRIORITY

This application claims the benefit under 35 U.S.C. §119(a) of a Korean Patent Application filed in the Korean Intellectual Property Office on Aug. 27, 2009 and assigned Serial No. 10-2009-0080108, the entire disclosure of which is hereby incorporated by reference.

BACKGROUND OF THE INVENTION

1. Field of the Invention

The present invention relates generally to a method and apparatus for setting a font size in a mobile terminal via a touch screen, and more particularly, to a method and apparatus for setting a font size displayed on a touch screen according to the area (or size) of a region touch-input by each user.

2. Description of the Related Art

In line with the current trend of providing a smaller mobile terminal with a large display area, a variety of mobile terminals with a touch screen have been launched. These new terminals can implement both a display and an input functions without having a separate display or input unit. The conventional touch screens are typically divided into two types: a resistive overlay touch screen and a capacitive overlay touch screen. Generally, in the case of the resistive overlay touch screen, a user can make a touch input with both a stylus pen and a finger tip, while in the case of the capacitive overlay touch screen, the user cannot make a touch input with the stylus pen.

In operation, a variety of menus are provided in mobile terminals having a touch screen to allow users to conveniently run each of their functions. However, in the case of the resistive overlay touch screen, a user may relatively and accurately input (or click) a small-size region using a stylus pen, while in the case of the capacitive overlay touch screen, the user must directly and accurately touch the surface of the touch screen with his or her finger tip to make an exact input. However, the habits of each user is different in the touch area of the region where he or she touches the touch screen, thus experiencing discomfort in attempt to accurately touch a desired item in a menu, which displays in a relatively small font size.

A separate menu capable of adjusting and setting the size of menu fonts has been provided. However, if a user is changed, the new user must directly find and enter a font size change menu to override the previous font size setting which may make several attempts to finally adjust the font size to a desired font size, thus creating inconvenience.

In addition, an Internet full-browsing function is provided in recent mobile terminals, allowing users to view the intact Internet screen which are available in Personal Computers (PCs) or notebook computers, even in the mobile terminals. However, in an attempt to run a desired function, the user may experience discomfort in accurately touching letters of a desired link or menu displayed on the Internet screen on which the full-browsing function is running as the Internet screen of the mobile terminal being smaller than those of the PCs or notebook computers.

SUMMARY OF THE INVENTION

An aspect of the present invention is to address at least the above-mentioned problems and/or disadvantages and to provide at least the advantages described below. Accordingly, an aspect of the present invention is to provide a method and apparatus for allowing each user to set a different font size according to the area of his or her touch region in a mobile terminal with a touch screen.

In accordance with one aspect of the present invention, a method for setting a font size in a mobile terminal with a touch screen includes: if a font size setting mode runs to set a font size displayed on the touch screen, determining whether a user's finger has touched the touch screen, and detecting an area of a region where the user's finger touch was made; loading or determining a font size corresponding to the detected area among preset font sizes, and displaying the determined font size in a specific region on the touch screen; and if a font size setting request to the displayed font size is received from the user, storing the displayed font size for a subsequent display on the touch screen.

In accordance with another aspect of the present invention, there an apparatus for setting a font size in a mobile terminal includes: a touch screen for sensing a touch and displaying a screen; a storage for storing a plurality of predetermined font sizes corresponding to different areas of a region where users' different-size fingers have touched the touch screen; and a controller for running, if a font size setting mode run request is received from a user, a font size setting mode, determining whether a user's finger has touched the touch screen, detecting an area of a region where the user's finger touch was made, determining a font size corresponding to the detected area among preset font sizes, displaying the loaded font size in a specific region on the touch screen, and if a setting request to the displayed font size is received from the user, storing the displayed font size for a subsequent display on the touch screen.

BRIEF DESCRIPTION OF THE DRAWINGS

The above and other aspects, features and advantages of certain exemplary embodiments of the present invention will be more apparent to those skilled in the art from the following description taken in conjunction with the accompanying drawings, in which.

DETAILED DESCRIPTION OF THE INVENTION

Figure 1A:
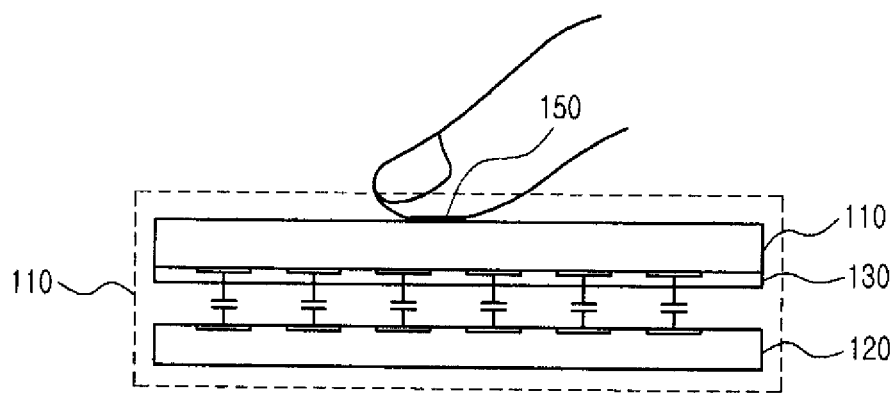
FIGS. 1A to 1C are diagrams showing the schematic structure and operation of the conventional touch screen with capacitive sensors.

Exemplary embodiments of the present invention will now be described in detail with reference to the accompanying drawings. It should be noted that throughout the drawings, the same drawing reference numerals will be understood to refer to the same elements, features and structures. In addition, descriptions of well-known functions and constructions are omitted for clarity and conciseness.

Figure 1B:
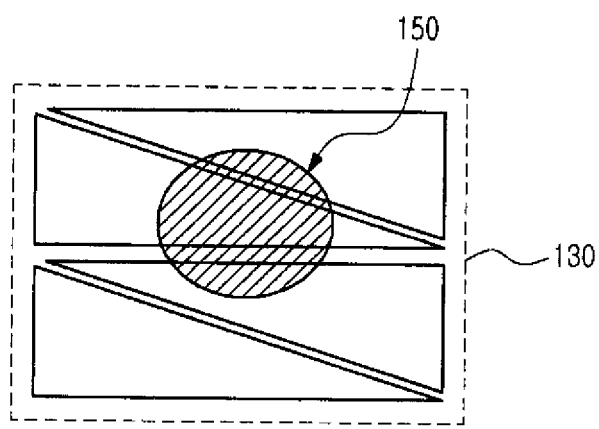
Figure 1C:
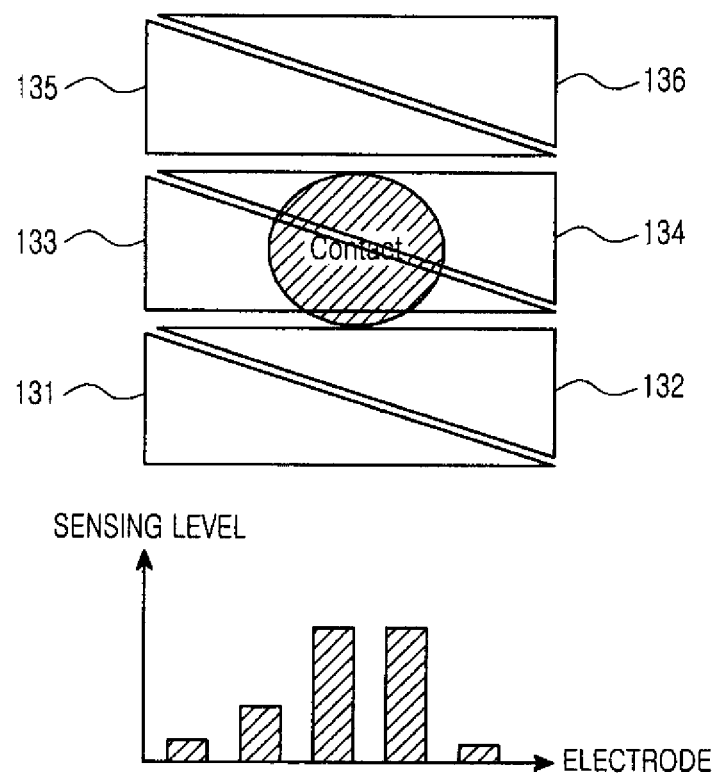

FIGS. 1A to 1C show the schematic structure and operation of the conventional touch screen with capacitive sensors.

FIG. 1A is a side view of a touch screen 110, the surface of which is touched by a user's finger tip.

The conventional touch screen 110 with capacitive sensors, generally includes a display 120 for screen displaying, a touch sensor 130 for sensing a touch, and a window 140 for protecting the display 120 and the touch sensor 130. The display 120 can display a variety of data related to the status and operation of the motile terminal, and the touch sensor 130 senses a touch input made by the user's touch and untouch onto/from the touch screen by the user.

As regard to the principle of sensing the touch, the touch sensor 130 senses additional electrostatic capacitances Cf occurring between the touch sensor 130 and the finger tip touching it, then calculates the actual touch area 150 according thereto.

Referring to FIGS. 1B and 1C, on the touch sensor 130 are repeatedly arranged a plurality of touch electrodes 131, 132, 133, 134, 135 and 136 in the form of a triangular bar in the Y-axis direction, lying on the X-axis direction, and are cross-engaged, facing each other in the X-axis direction. Since an X-axis coordinate is determined using the area ratios of the electrodes and a Y-axis coordinate has been predefined, the touch screen 110 can determine the electrodes, onto which a finger tip has actually touched and at which additional electrostatic capacitances have occurred, and based thereon, can calculate the coordinates and area of the touch region. More specifically, the coordinates and area of the actually touched (or contacted) region can be determined according to the levels of sensed electrostatic capacitances occurring on the touch electrodes 131, 132, 133, 134, 135 and 136 located in the touch region, as shown by the graph of FIG. 1C. While it has been described that the touch sensor 130 for the touch screen 110 includes a plurality of electrodes in the form of a triangular bar, the form and arrangement of the electrodes may be different according to the touch screen manufacturers.

Figure 2:
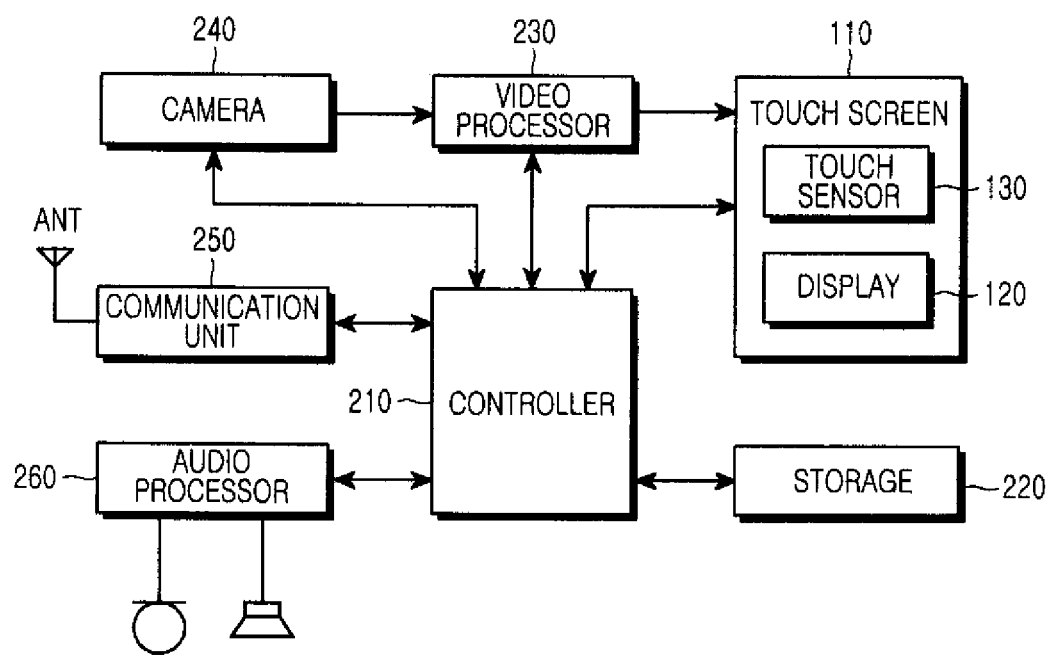
FIG. 2 is a block diagram showing a schematic structure of a mobile terminal according to an embodiment of the present invention.

FIG. 2 shows a schematic structure of a mobile terminal according to an embodiment of the present invention.

Referring to FIG. 2, the mobile terminal includes a controller 210, a storage 220, a touch screen 110, a video processor 230, a camera 240, a communication unit 250, and an audio processor 260, and in specifics, although not shown, the touch screen 110 further includes the display 120 and the touch sensor 130 described in FIGS. 1A to 1C.

The controller 210 controls the status and operation of most components of the mobile terminal. In particular, if a font size setting mode run request is received from a user, the controller 210 switches an operation mode of the mobile terminal to a font size setting mode. If a touch is sensed through the touch sensor 130 in the touch screen 110, the controller 210 detects the coordinates and area of the touch region. Upon detecting the area of the touch region on the touch screen 110, the controller 210 loads or selects a font size corresponding to the detected touch area among the font sizes which are stored in the storage 220 in advance, and displays the loaded font size in a specific region on the display 120 in the touch screen 110. For example, a letter or a number corresponding to the loaded/selected font size can be displayed. Thereafter, upon receipt of a user's setting request to the displayed font size, the controller 210 stores the displayed font size in the storage 220, and then controls to display characters on the display 120 in the touch screen 110 according to the stored font size.

Upon user's additional request to adjust the displayed font size, with the loaded font size displayed, the controller 210 additionally adjusts the font size and displays according to the adjusted font size. Thereafter, upon user's setting request to the adjusted font size, the controller 210 stores the adjusted font size in the storage 220 and then may control, in the same way, to display characters on the display 120 in the touch screen 110 according to the stored font size. While it has been described that the font size setting mode runs upon a user's request, the controller 210 may control to automatically run the font size setting mode during initial booting of the mobile terminal or during menu entry by a user input according to the user settings or manufacturer settings.

The storage 220 stores application programs needed to run respective functions of the mobile terminal, and a variety of data generated during running of the functions of the mobile terminal. In particular, the storage 220 according to an embodiment of the present invention may store in advance the font sizes by mapping them to the associated areas of the determined touch regions. That is, the areas of the touch regions and their appropriate font sizes may be stored in the form of a look-up table. Upon a font size setting request of the user, the storage 220 may store the set font size so that the letters to be displayed later on may be displayed according to the set font size.

The touch screen 110 includes the display 120 and the touch sensor 130. The display 120 may display a variety of data related to the status and operation of the mobile terminal, and menus related to respective functions thereof. In particular, the display 120, under the control of the controller 210, may display a font size corresponding to the area of the region where the user's finger touch is sensed, and display menus related to respective functions of the mobile terminal in the font size set upon the user's setting request. The display 120 may generally include a Liquid Crystal Display (LCD), an Organic Light Emitting Diodes (OLED), and the like, but it is subject to change according to the mobile terminal manufacturers.

The touch sensor 130, which is generally mounted on the top of the display 120, senses additional electrostatic capacitances generated by a touch of a user's finger or the like, detects the coordinates and area of the sensed region, and delivers the detected coordinates and area to the controller 210. A detailed description thereof has been made in connection with FIGS. 1A to 1C, thus omitted to avoid redundancy.

The touch screen 110 displays on the display 120 a menu and/or soft key for running each of the functions of the mobile terminal, and if a user's touch is sensed on the touch sensor 130 in the location where the menu or soft key is displayed, the touch sensor 110 informs the controller 210 of the presence of a function run request assigned to the menu or soft key. Accordingly, inputs such as a font size setting mode run request and a font size setting request among the foregoing details may be carried out on the touch screen 110.

The video processor 230 processes video data for displaying a video signal output from the camera 240. The video processor 230 processes the video signal output from the camera 240 on a frame basis, and outputs the processed frame video data according to the characteristics and specifications of the display 120 in the touch screen 110. The video processor 230, including a video codec, performs a function of compressing the frame video data displayed on the display 120 using a preset scheme, and/or restoring the compressed frame video data to the original frame video data.

The camera 240 converts the light being input through a lens into digital data, using a camera sensor such as a Charge Coupled Device (CCD) and a Complementary Metal-Oxide Semiconductor (CMOS). To be specific, the camera 240 is mounted in the form of a module including the camera sensor for converting an input light signal into an electrical signal. The video processor 230 may also be integrally mounted in the camera 240 in the form of a module, but may be adapted such that its functions are performed in the controller 210.

The communication unit 250 is responsible for the wireless communication function of the mobile terminal. The communication unit 250 may include a Radio Frequency (RF) transmitter for frequency up-converting a transmission signal and amplifying the up-converted signal, and an RF receiver for low noise-amplifying a received signal and frequency downconverting the amplified signal.

The audio processor 260 preferably includes a codec to restore a digital audio signal received at the communication unit 250 by converting it into an analog signal, and/or to convert an along audio signal picked up by a microphone MIC into a digital audio signal. The codec includes a data codec for processing packet data or the like, and an audio codec for processing audio signals such as voice. The codec may be included in the controller 210.

Although not shown in the drawings, in addition to these components, various other components may be additionally included, such as a digital broadcast receiver (e.g., a digital multimedia broadcasting (DMB) receiver and a Digital Video Broadcasting (DVB) receiver) capable of receiving digital broadcast signals, and an Internet receiver for performing Internet functions over the Internet.

To perform the Internet functions, a mobile terminal with the Internet receiver may have a full-browsing function, which refers to a service in which even with a mobile terminal, a user can view text/video screens in the same form as those in the general Internet sites, which are available in PCs, notebook computers, and the like. In this case, the mobile terminal may be adapted to perform the similar functions even on various links and menus provided on the full-browsing screen.

That is, under the control of the controller 210 of the mobile terminal, the font size of various links and menus provided on the full-browsing screen may be properly adjusted by calculating the area of the touch region on the touch screen 110. In some cases, however, adjusting only the font size may seem somewhat discordant. Thus, the whole screen displayed on the display 120 in the touch screen 110 may be zoomed in or out by adjusting even a resolution of the Internet full-browsing screen according to the adjusted font size.

Even if the camera function or the digital broadcast function of the mobile terminal is being run, the font size of various menus related to the camera function or digital broadcast function, displayed on the display 120 in the touch screen 110 may be adjusted as described above, under the control of the controller 210 of the mobile terminal.

Now, reference will be made to FIG. 3 to describe a method for setting a font size in a mobile terminal with a touch screen 110 according to an embodiment of the present invention.

Figure 3:
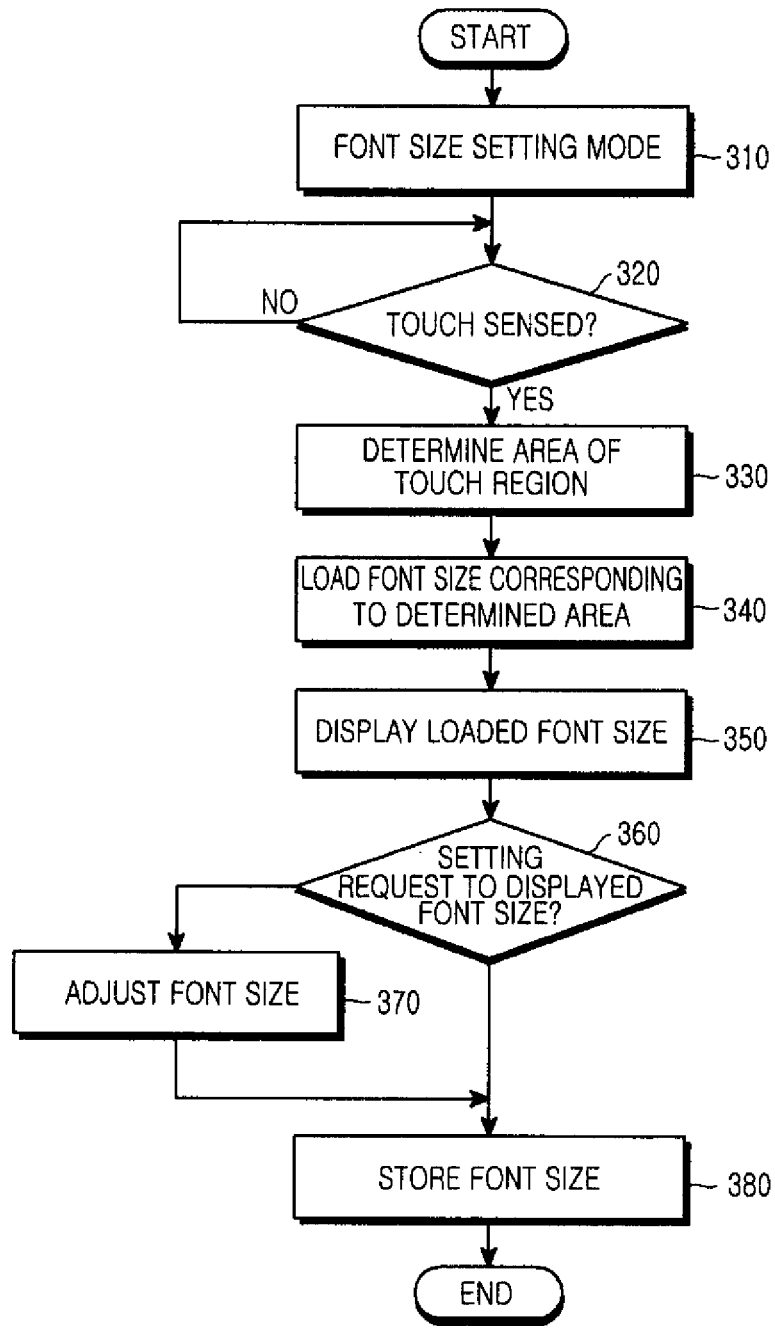
FIG. 3 is a flowchart showing a method for setting a font size in a mobile terminal with a touch screen according to an embodiment of the present invention.

Referring to FIG. 3, if a user selects a font size setting mode using a menu or a separate soft key to set a font size displayed on the touch screen 110, the controller 210 switches an operation mode of the mobile terminal to the font size setting mode in step 310. While it has been described that if the font size setting mode is selected by means of the menu or soft key selected by the user, a keypad-based setting mode is performed in a manual way, the controller 210 may be adapted to automatically perform the font size setting mode during initial booting of the mobile terminal or during menu entry by a user input according to the user settings or manufacturer settings.

In the font size setting mode, the controller 210 determines in step 320 whether a user's touch is sensed on the touch sensor 130 in the touch screen 110. If the touch is sensed, the controller 210 determines the area of the touch-sensed region in step 330. A process of determining the area of the touch-sensed region has been described in detail in conjunction with FIGS. 1A to 1C. After determining the area of the touch-sensed region, the controller 210 loads a font size corresponding to the area of the touch-sensed region among the font sizes stored in the storage 220 in step 340, and displays the loaded font size on the display 120 in the touch screen 110 in step 350. A number indicating the font size (for example, '5' indicating a font size of 5) may be displayed as the font size, or a preset message (for example, 'the current font size is 5') may be displayed as the font size.

In step 360, the controller 210 determines whether a setting request to the displayed font size is input from the user. The setting request may be input by the user using a menu or a soft key displayed on the touch screen 110. If the setting request is input, the controller 210 stores the displayed font size in the storage 220 in step 380. The stored font size becomes a font size, in which mobile terminal's menus running later on will be displayed.

If a request to adjust the displayed font size is additionally input from the user before the setting request is input, the controller 210 determines in step 370 whether a font size adjust request is input through a menu or a soft key displayed on the touch screen 110. The font size adjust request may be realized by displaying an arrow key, a '+/−' key, and/or numbers corresponding to font sizes on the touch screen 110 and letting the user touch one of them.

As is apparent from the foregoing description, with use of the font size setting method and apparatus for a mobile terminal with a touch screen according to an embodiment of the present invention, any user of the mobile terminal may appropriately change a font size according to his or her touch input, thereby accurately touch-inputting menus or Internet links displayed on the touch screen.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for displaying characters in a mobile terminal with a touch screen, comprising:
   detecting an area of the touch screen touched by a finger;
   determining a font size based on the detected area;
   displaying at least one character according to the determined font size; and
   adjusting a resolution of a screen of the touch screen according to the determined font size.

2. The method of claim 1, wherein the detecting step is automatically performed upon booting of the mobile terminal.

3. The method of claim 1, further comprising selectively adjusting the displayed font size by a predetermined amount according to a user request.

4. The method of claim 1, wherein the font size of the mobile terminal corresponds to a font size of menus displayed on the mobile terminal.

5. The method of claim 4, wherein the font size setting mode is automatically performed upon entry into the menus.

6. The method of claim 1, wherein the mobile terminal includes an Internet function.

7. The method of claim 6, wherein the font size of the mobile terminal corresponds to a font size of links or menus on an Internet screen.

8. The method of claim 6, wherein the detecting step is automatically performed upon entry into the Internet function.

9. The method of claim 1, further comprising, storing the displayed font size and the adjusted resolution for a subsequent display.

10. An apparatus for displaying characters in a mobile terminal, comprising:
    a touch screen for sensing a touch and displaying a screen; and
    a controller for detecting an area of the touch screen touched by a finger, determining a font size based on the detected area, displaying at least one character according to the determined font size, and adjusting a resolution of the screen of the touch screen according to the determined font size.

11. The apparatus of claim 10, wherein the controller performs detecting the touched area upon booting of the mobile terminal.

12. The apparatus of claim 10, wherein the displayed font size is selectively adjusted by a predetermined amount according to a user request.

13. The apparatus of claim 10, wherein the font size of the mobile terminal corresponds to a font size of menus displayed on the mobile terminal.

14. The apparatus of claim 13, wherein the controller controls to automatically run the font size setting mode upon entry into a menu of the mobile terminal.

15. The apparatus of claim 10, wherein the mobile terminal includes an Internet function.

16. The apparatus of claim 15, wherein the font size of the mobile terminal corresponds to a font size of links or menus on an Internet screen.

17. The apparatus of claim 15, wherein the controller performs detecting the touched area upon entry into the Internet function.

18. The apparatus of claim 10, wherein the controller stores the displayed font size and the adjusted resolution for a subsequent display.

* * * * *